Figure 1:
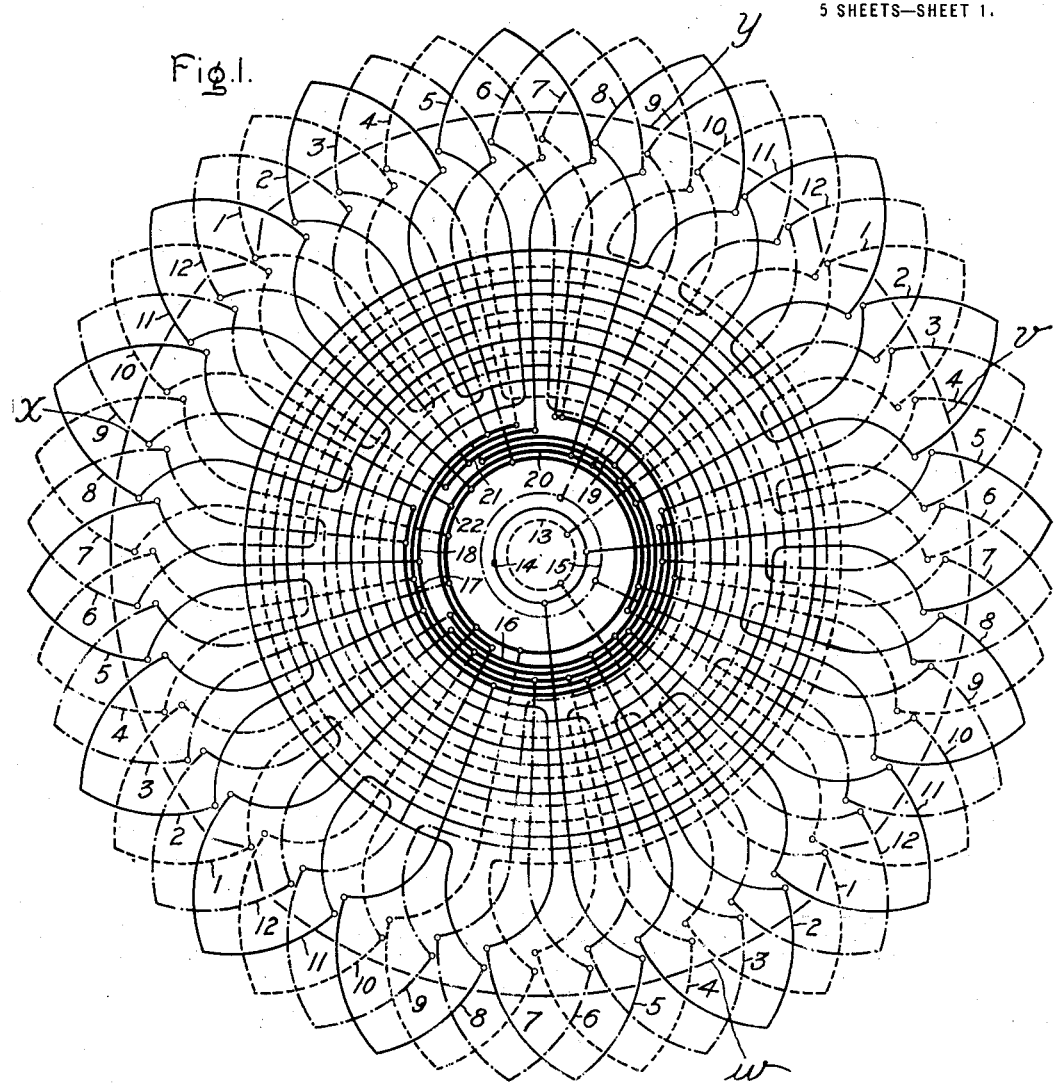

L. J. HUNT.
ALTERNATING CURRENT DYNAMO ELECTRIC MACHINE.
APPLICATION FILED DEC. 10, 1915.

1,246,602.

Patented Nov. 13, 1917.
5 SHEETS—SHEET 1.

Inventor:
Louis J. Hunt,
by Albert G. Davis
His Attorney.

L. J. HUNT.
ALTERNATING CURRENT DYNAMO ELECTRIC MACHINE.
APPLICATION FILED DEC. 10, 1915.

1,246,602.

Patented Nov. 13, 1917.
5 SHEETS—SHEET 2.

Inventor:
Louis J. Hunt,
by Albert G. Davis
His Attorney.

Inventor:
Louis J. Hunt,
by Albert G. Davis
His Attorney.

Inventor:
Louis J. Hunt,
by Albert G. Davis
His Attorney.

L. J. HUNT.
ALTERNATING CURRENT DYNAMO ELECTRIC MACHINE.
APPLICATION FILED DEC. 10, 1915.

1,246,602.

Patented Nov. 13, 1917.
5 SHEETS—SHEET 5

Inventor:
Louis J. Hunt,
by Albert G. Davis
His Attorney.

UNITED STATES PATENT OFFICE.

LOUIS J. HUNT, OF SANDYCROFT, WALES, ASSIGNOR TO GENERAL ELECTRIC COMPANY, A CORPORATION OF NEW YORK.

ALTERNATING-CURRENT DYNAMO-ELECTRIC MACHINE.

1,246,602.  Specification of Letters Patent.  Patented Nov. 13, 1917.

Application filed December 10, 1915. Serial No. 66,057.

*To all whom it may concern:*

Be it known that I, LOUIS J. HUNT, a subject of the King of Great Britain, residing at Sandycroft, in the county of Flint, in the Principality of Wales, have invented certain new and useful Improvements in Alternating-Current Dynamo-Electric Machines, of which the following is a specification.

This invention relates to alternating current motors and particularly to the secondary windings of such motors. It has for its object a novel arrangement of such a winding of the distributed type, the coils of which are interconnected in such a way that the winding is adapted for operation with a field of one number of poles, by providing external connections for the winding in order to complete the circuits thereof, and also for operation with a field of a different number of poles, by reason of the interconnection of the coils which provide local circuit paths for such number of poles. Hereinafter I will call the number of poles, for which external connections for the winding are provided in order to complete the circuit thereof, the basal number of poles, and will call such number of poles, N.

A winding for any number of poles N. may be considered as having a number of similar sections, each comprising a number of poles which form a unit or indivisible "block" as will be hereinafter described. The number of poles in a unit block will be designated $s$. $N/s$ gives the number of units or "blocks" contained in the winding. The number of units will be referred to hereinafter as U. It will now be assumed that it is required to adapt such a winding to run at a speed corresponding with another number of poles, say $n$. Then $n/U$ gives the number of poles of the desired field which will be contained in each unit or block.

The quantity $n/U$ may be even, odd, or a fraction, and different considerations arise in each case. Before considering these cases it is desirable to explain clearly what is meant by connecting the windings in "series" and in "parallel". In "series" connections, the coils similarly situated in two or more blocks or groups are in series, while in "parallel" connections such similar coils are in parallel and all the star or inter-connection points of the various blocks or groups of windings are connected together. For the purpose of the present invention it is desirable to state that wherever "series" and "parallel" connections are referred to, they indicate windings connected in series or parallel so far as the normal working of the machine is concerned, at the N-pole speed. Connections which are "parallel" for such working may for instance become star connections for working at $n$-pole speed, as will appear from the following description.

The parallel connection is the only possible one if the corresponding coils of the various blocks or groups of coils when acted on by an $n$-pole field, have the currents therein at different phases at the same instant, and the parallel connections for normal working may then become star connections for $n$-pole working. If, however, the currents in corresponding coils or adjacent, alternate, or any blocks are in phase during $n$-pole working, such coils may generally be connected either in series or in parallel.

In order to ascertain whether it is possible to attain the desired result in any particular case with series connections only, or with some series connections and some parallel connections, we must consider the fraction $n/U$, which gives the number of poles of the $n$-pole field contained in each block.

If $n/U$ is an even whole number, it means that similarly situated coils in all of the blocks will have voltages induced in them which are in phase both for normal N-pole working and also for $n$-pole working. The similarly situated conductors in the different blocks may then be connected either in series or in parallel.

If $n/U$ is an odd whole number, it means that similarly situated coils in adjacent blocks will have voltages induced in them which are 180° apart in phase. Hence, adjacent blocks (or blocks having their coils in the same phases as adjacent blocks) must be connected in parallel for normal working so that the currents can flow in series from one block to another for $n$-pole working, thus reversing the direction or flow for the coils of one block with respect to those of another, for $n$-pole working as compared with N-pole working. If there are more than two sets of pairs of blocks, the corresponding coils of alternate blocks can be connected in series as they are in phase both for N-pole and for n-pole working in this case; they may also be connected in parallel of course, but our present object is to see whether any series connections are allowable.

If $n/U$ is an irreducible fraction, then similar conductors of the various blocks will not be in phase or even in opposition of phase. The voltages induced in similar conductors in adjacent units will differ in phase by $360/U$ electrical degrees if U is a prime number. In such a case, the corresponding coils in all the blocks can only be connected in parallel (for normal working), and the currents for n-pole working will circulate locally through the interconnections of the several windings, each of such interconnections providing a star connection joining coils which may be in three-phase relation, five-phase relation and so forth to one another.

If the denominator is not a prime number, and if both numerator and denominator are capable of division by a number, say 2 or 3, to reduce the fraction to lower terms, while still leaving the numerator even, then there may be 2 or 3 or more sets of blocks which must be in parallel among themselves, but may be in series one with another from set to set, as the currents for n-pole working will be in phase for corresponding coils of each such set.

In order to illustrate the above statements, some examples will now be given, with reference to the accompanying drawings wherein each of Figs. 1, 3, 5, 7, and 9 shows a diagram of a complete winding with its end connections, while 2, 4, 6, 8, and 10 are corresponding key diagrams.

In Figs. 1 to 8 of the drawings I have illustrated my invention as applied to a distributed secondary winding adapted for cascade operation as described, for instance, in my United States Patent Reissue No. 13591, dated July 8th, 1913. It is well known that a machine provided with cascade connected windings can be made to run at three speeds corresponding respectively to the two basal pole numbers, which have a ratio of two to one, and to the cascade speed which corresponds to the sum of these two basal pole numbers, external connections being provided to complete the circuits of the winding for the basal numbers of poles. In accordance with my invention such a machine may be adapted to work at a different speed or speeds, from either of the three above referred to. In all cascade connected secondary windings of the type referred to, the pitch of the coils is normal for one of the basal pole numbers, and, for instance, in a winding as shown in Fig. 15 or Fig. 16 of the above mentioned patent for which the basal pole numbers are 4 and 8, the pitch of the winding is normal for eight poles. In a secondary winding of the type described in the above mentioned patent, a unit or indivisible "block" comprises four poles and, consequently, $s$ equals 4.

The conventions set forth in the specification of my above mentioned patent are adopted in this case in the diagrams, for showing currents in the three phases, there referred to as phases $a$, $o$ and $b$; it is assumed that the current in the phase shown by full lines (phase $a$) is at its maximum value at the instant chosen, while currents in the phases shown by dotted and chain-dotted lines respectively (phases $c$ and $b$), are at half the maximum value at the same instant.

The respective blocks each normally including four poles, are lettered $v$, $w$, $x$, $y$ and $z$ or by as many of these letters as are needed in each case, and the coils of each block are numbered from 1 to 12 in each case. Then in the key diagrams the respective coils can be distinguished by their letters and numbers combined, for example 1 and $v$, 2 and $v$, and so forth.

A winding consisting of coils having a pitch equal to 1/16 of the circumference (normal 16-pole pitch) is known to be suitable for running at three speeds corresponding respectively to 8, 16 and 24 poles. Here U is equal to 4 (16/4), that is to say the winding has four blocks of four normal poles each. Taking the numbers 8, 16 and 24 and dividing them by U, we get 2, 4 and 6. These figures are all even numbers and therefore the known windings can be connected in series (or also of course in parallel) for each of these numbers of poles because corresponding points are always in phase. As however $n/U$ for 24 poles is 6, i. e., greater than 4, the winding would not be satisfactory with series connections for 24 poles, except when running in cascade. The reason for this is that with series connections the winding is only suitable for three-phase or for six-phase currents such as are obtained with interconnected star-mesh windings; hence, such series connections cannot be used where the number of poles in each unit or block during n-pole working is to be greater than 4 for then the currents in adjacent coils of the respective blocks would differ in phase, or in opposition of phase by less than 60°. The currents would not then combine as is essential if the star-mesh connection is to carry resultant currents in the required phases. It has not been possible heretofore to obtain additional intermediate speeds with the known construction and connections of these windings, as set forth for instance in United States Patent Reissue 13591, as that patent deals only with simple series or simple parallel connections, and by no means all of the star points of the blocks are connected in parallel in that case, as would be necessary for working at an intermediate speed. For $n$ to be 12, $n/U$ would be 3, in that case, and all star-connections of adjacent pairs of blocks must be connected in parallel (for normal working) so that for $n$-pole working they may provide paths for the reversal of flow of the currents in one phase with respect to the next. As 12/4 is divisible by 2, so as to leave the numerator even, there are two sets of blocks which can be connected in series, though the two blocks of each set must be in parallel as stated. Again, for $n$ to be 20 in that case, $n/U$ is 5, and is odd, so that pairs of adjacent blocks must be connected in parallel; but 20/4 is divisible by 2 so as to leave the numerator even, and hence there can be two sets, each containing two blocks which are parallel-connected, but the sets can be series-connected as similar conductors in alternate blocks carry currents in phase for N-pole and also $n$-pole working. Hence, the same type of connections, viz., 2 blocks in parallel with two sets of series connections, will serve both for 12-pole and for 20-pole speeds.

Figure 2:
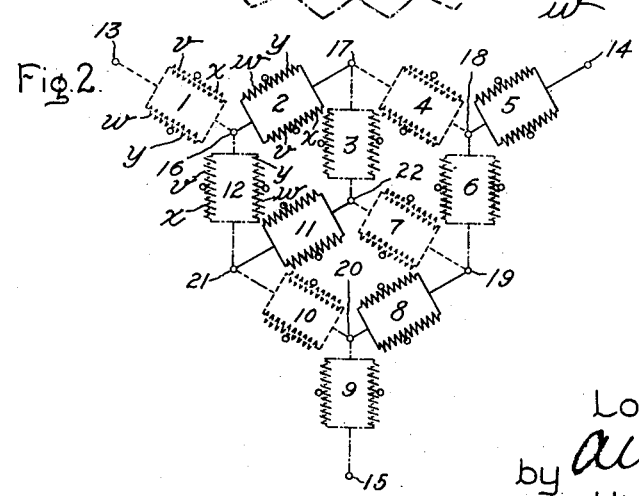

Figs. 1 and 2 show such a winding. The extent of each of the four unit blocks is indicated by a line, the lines being marked $v$, $w$, $x$ and $y$. The slip rings are marked 13, 14 and 15, and are connected to the respective coils as follows: Slip ring 13 is connected in parallel to coil 1 in each of the blocks $v$ and $w$. Slip ring 14 is connected in parallel to coil 5 in each of the blocks $v$ and $w$. Slip ring 15 is connected in parallel to coil 9 in each of the blocks $y$ and $v$. Each of these coils is connected in series as shown with a coil correspondingly numbered in the block in a diametrically opposite position; for instance coil 1 of block $v$ is in series with coil 1 of block $x$. There are seven star-connections as seen from the key diagram, Fig. 2, and these are distinguished in Fig. 1 by thick lines 16 to 22 inclusive. In Figs. 1 and 2 the phases are shown correctly for normal working at 16-pole speed, in which case the terminals of the secondary winding connected to the slip rings 13, 14 and 15 must be connected together through an external resistance or short-circuited. For 12-pole and 20-pole speeds, the twelve closed circuits comprising all the coils marked 1, all those marked 2, and so forth, as seen clearly in the key diagram, Fig. 2, form closed paths in which currents can circulate in phase relations which depend upon the numbers of poles. For 12 poles the currents are two-phase, and for 20 poles they are six-phase. It will therefore be seen from Figs. 1 and 2, that similarly situated coils of each unit block are interconnected to form local circuit paths giving fields of numbers of poles other than the basal pole numbers, and that some of said local circuit paths are connected in mesh, and others of said local circuit paths are connected to points of the mesh.

Figure 3:
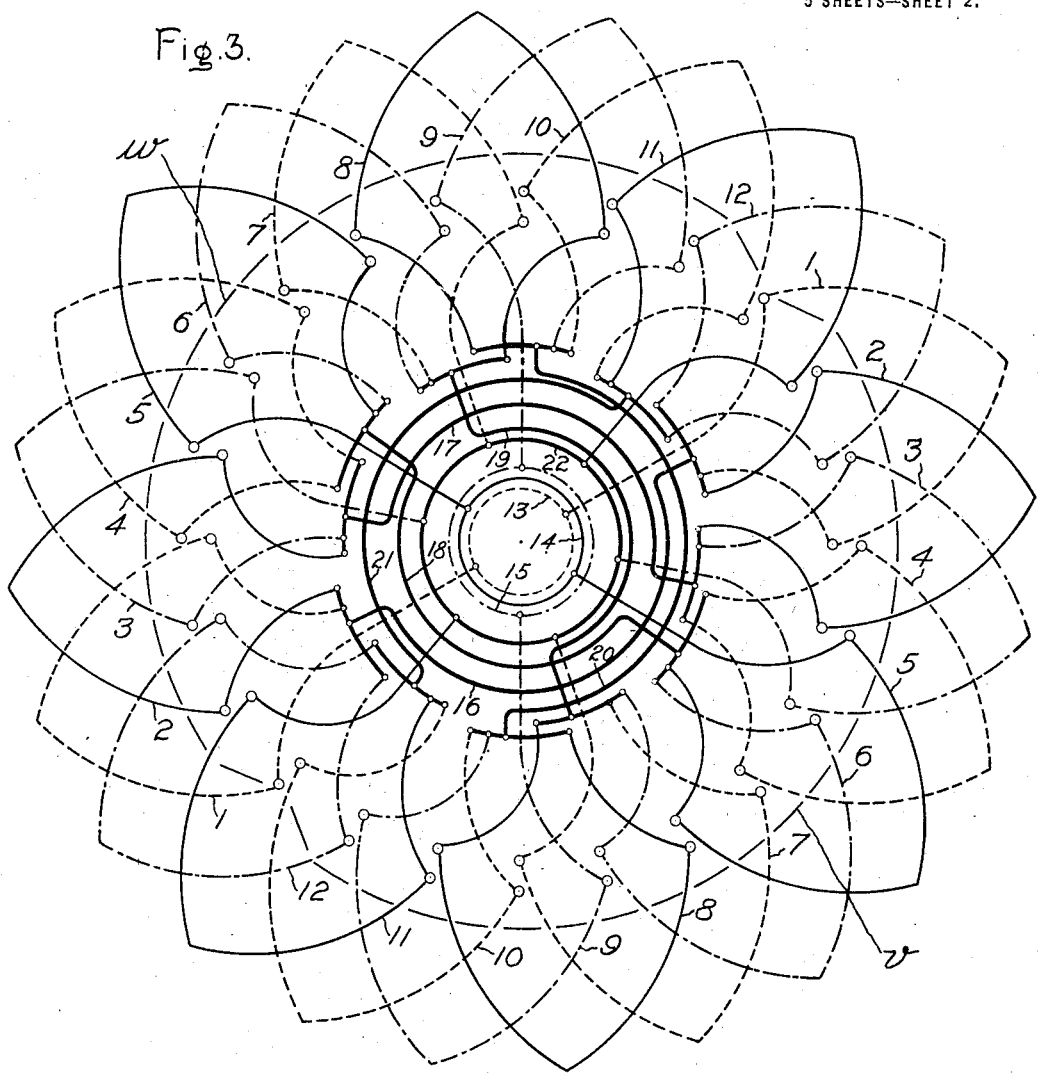
Figure 4:
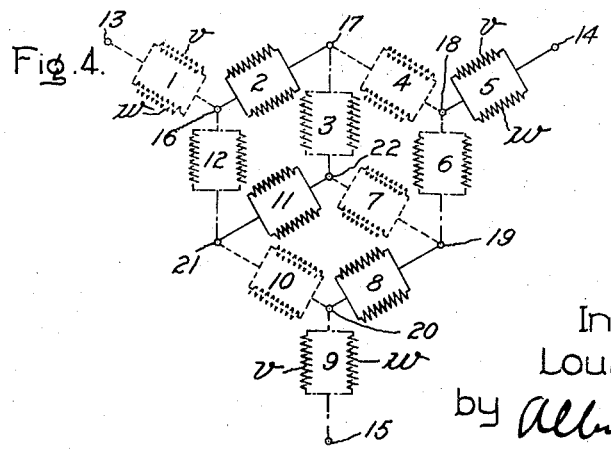

The smallest value for N in a machine of the type of the above mentioned patent, in which the magnetic fields are not unbalanced, is 8. In such a machine, the three known speeds correspond with 4, 8 and 12 poles. If it is required to adapt such a machine to run at a 6-pole speed, then $n$ is 6, U is 2, so $n/U$ is 3. The winding only contains two units or blocks $v$ and $w$. Hence corresponding points in the two blocks cannot be connected in series as they would be in phases 180° apart with the $n$-pole excitation; they can however be connected in parallel, as shown in Figs. 3 and 4 so that the current flowing out from a point in one winding unit can flow into the other winding unit at a corresponding point, under $n$-pole excitation. The winding then takes the form of two blocks or groups of coils $v$ and $w$ each similar to that shown in Figs. 12 and 14 of my above mentioned patent. The slip rings 13, 14 and 15 are connected in parallel to coils 1, 5 and 9 respectively of the two blocks $v$ and $w$, and correspondingly numbered coils of each block are connected in parallel to star connections 16 to 22. When this winding is acted upon by a field giving either 4 or 8 poles, the currents flow through the slip rings, and their external connections, but when acted upon by a field giving 6 poles, the induced currents circulate through the short-circuited paths formed by the interconnections of the corresponding coils of each block, and the slip rings can be open-circuited if desired. There are currents in two phases during 6-pole working.

Figure 5:
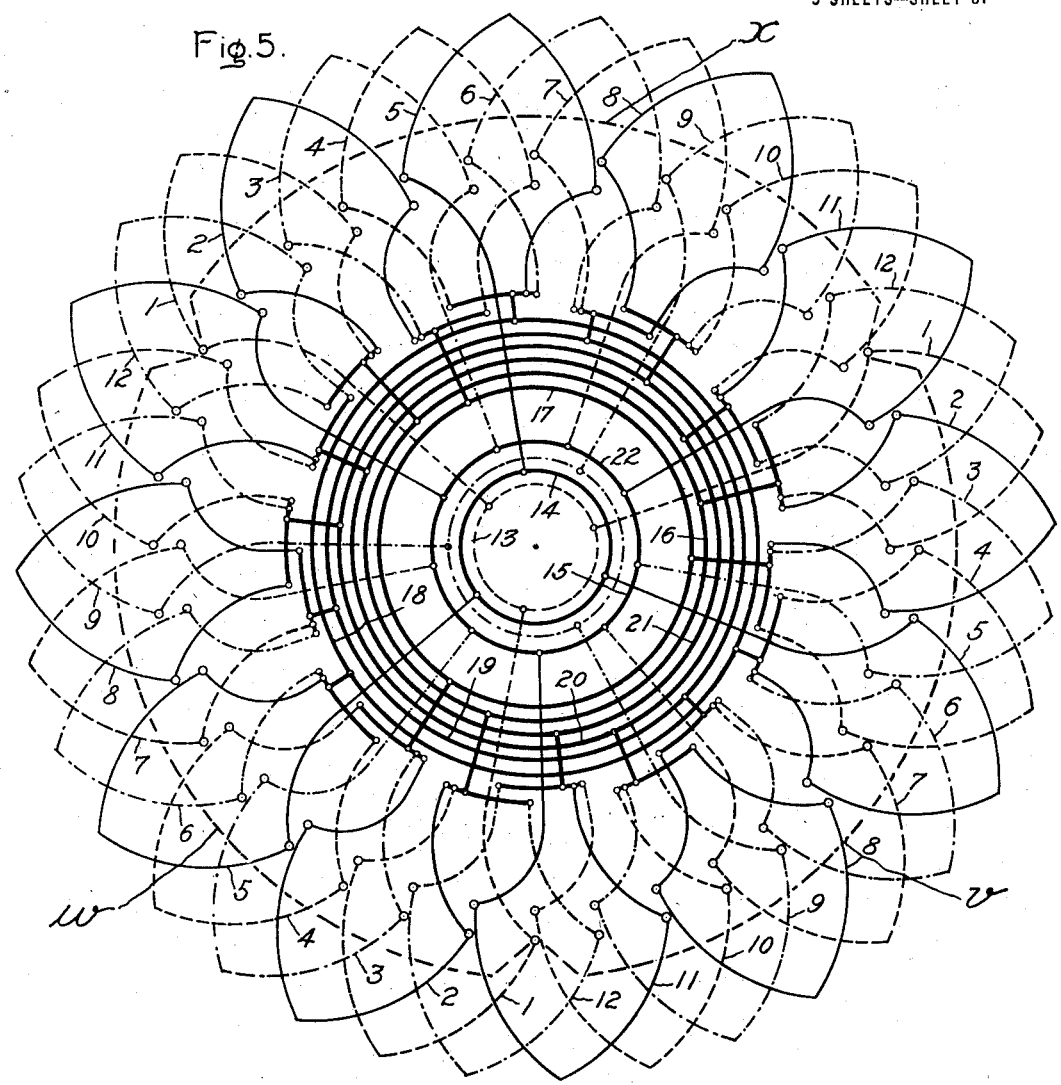
Figure 6:
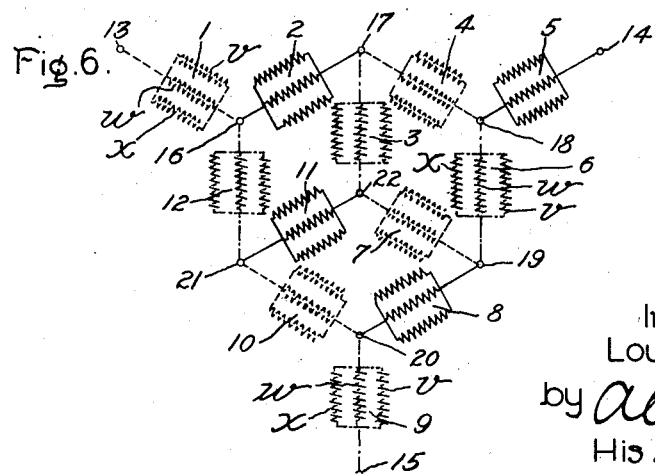

If N be 12 so that the basal pole numbers are 6 and 12, and the cascade speed for the machine corresponds with 18 poles, and if then it is required that $n$ should be 14, it is seen that $n/U$ will equal 14/3. The winding is divided into three blocks $v$, $w$ and $x$ as shown in Figs. 5 and 6, and corresponding coils in the three blocks will be 360/U, i. e., 120 electrical degrees apart in phase for $n$-pole working. Hence the blocks have correspondingly numbered coils therein connected together in parallel, as at 16 to 22, the similar coils 1, 5 and 9 of each winding being connected to slip rings 13, 14 and 15. Each parallel connection forms a 3-phase star-connection when the machine is running at the $n$-pole speed. Similarly, for $n=10$, with $N=12$ we get $n/U=10/3$ and three parallel groups must be used as in the drawing, Figs. 5 and 6.

Figure 7:
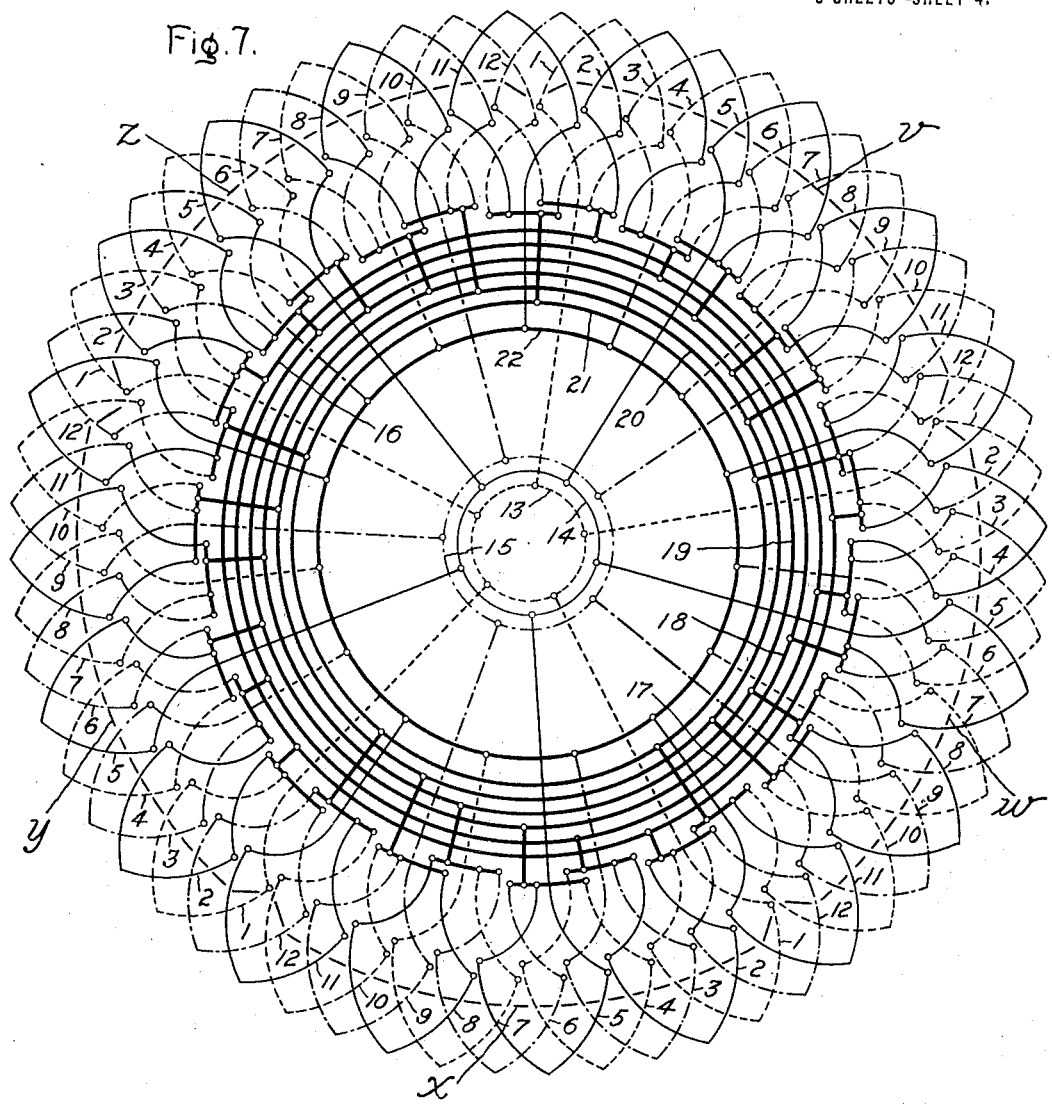
Figure 8:
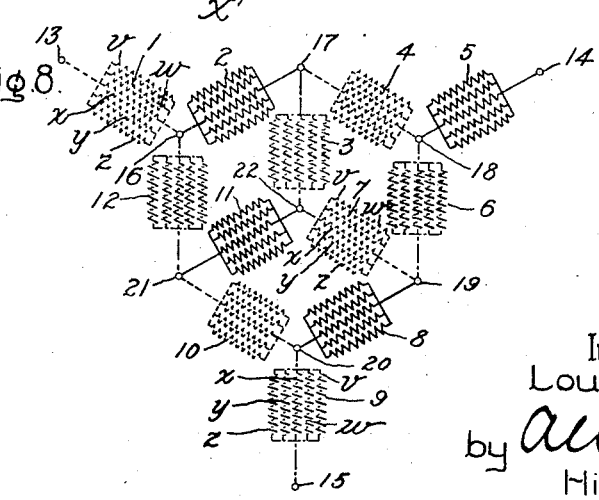

For a winding in which N is 20, and U is 5 as in Figs. 7 and 8, there are 5 blocks $v$ to $z$ which must be connected separately with all their corresponding points connected in parallel at 16, 17, 18, 19, 20, 21, 22, and five-phase currents then circulate during $n$-pole working in the local circuits of the windings through the star connections provided at 16 to 22, assuming that $n$ is to be 14 or another number such that $n/U$ is a fraction.

Figure 9:
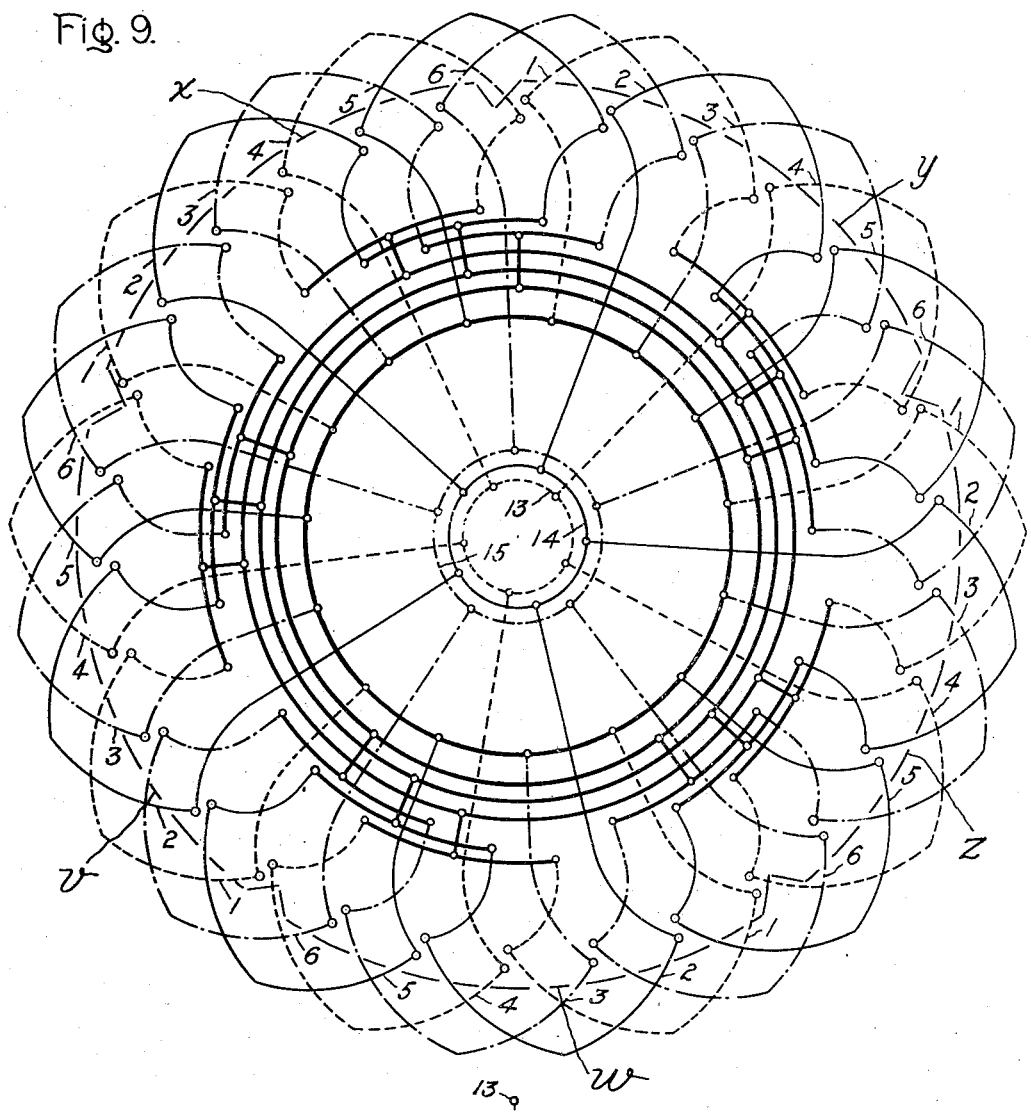
Figure 10:
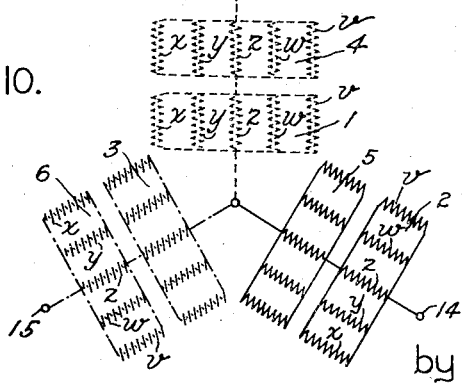

In Figs. 9 and 10 I have illustrated my invention applied to an ordinary star connected distributed winding in which the number of poles in a unit or indivisible block is 2, that is, $s$ equals 2. In the particular winding illustrated the winding must have external connections to complete the circuits thereof for 10-pole working, that is, N, the basal number of poles, is 10 and U is 5. There are therefore, 5 blocks, $v$ to $z$, each having six coils, numbered 1 to 6. Correspondingly numbered coils in the five blocks are connected in parallel and then 5-phase currents circulate during $n$-pole working in the local circuits of the windings, assuming that $n$ is to be 6, or another number, such that $n/U$ is a fraction. When the winding is acted on by a primary field of 10 poles, the currents flow through the slip rings 13, 14 and 15 and their external connections, but when acted upon by a field of 6 poles, the induced currents circulate through the short-circuited paths formed by the interconnections of the corresponding coils of each block. The pitch of the winding is shown in Fig. 9 as being normal for ten poles. For this pitch, the winding is most economical, but it is evident that in ordinary star connected windings the pitch may be varied within wide limits.

The winding shown in Fig. 9 may also be reconnected with the same pitch, for N equal to 6 and $n$ equal to 10, then $s$, as before, is equal to 2, but the number of coils in each indivisible block would be ten. U is equal to 6/2=3. In this case there would be five collector rings and for six pole working there would be two sets of three coils in parallel per phase and the phases would be in five phase relation, whereas for ten pole working, each of the three coils which were in parallel for the six-pole connection, will be in a local three-phase short-circuit.

In all the figures of the drawing I have illustrated, for the sake of simplicity, windings in which there is but one coil per pole per phase, but it is evident that any number of coils per pole per phase may be used and that in general such will be the case.

The field for adapting the machine to work with the different number of poles may be produced in any suitable way, as by inserting an additional primary winding in the slots of the field member, such windings being of a normal type to give the requisite number of poles ($n$). Again, the primary winding may take the form of a Gramme ring, and by connections at suitably spaced points it can be arranged to be used for a large number of different poles. Usually the primary member will be the stator, and this has been assumed in the preceding description where it is stated that slip rings are used for controlling the flow of the currents in the secondary winding. The functions of stator and rotor may obviously be reversed however.

What I claim as new and desire to secure by Letters Patent of the United States, is,—

1. In an alternating current motor, a secondary winding of the distributed type adapted for operation with a field of a number of poles, and means external to said winding for connecting the terminals thereof together so that currents can flow in said winding to give a field equal to said number of poles, said winding being arranged in unit blocks or groups, the coils of the respective blocks or groups being interconnected in such a way that currents can flow in local circuit paths giving a field of a number of poles other than said number or double or half said number of poles.

2. In an alternating current motor, a secondary winding of the distributed type adapted for operation with a field of a number of poles, a primary winding for producing a field of a number of poles other than said number or double or half said number of poles, said secondary winding being arranged in unit blocks or groups, the coils of the respective unit blocks or groups being interconnected in such a way that currents can flow in local circuit paths giving a field corresponding to the number of poles of said primary winding.

3. In an alternating current motor, a secondary winding of the distributed type adapted for operation with a field of a number of poles, and means external to said winding for connecting the terminals thereof together so that currents can flow in said winding to give a field equal to said number of poles, said winding being arranged in unit blocks or groups, similarly situated coils of the unit blocks or groups being interconnected to form local circuit paths giving a field of a number of poles other than said number or double or half said number of poles.

4. In an alternating current motor, a secondary winding of the distributed type adapted for operation with a field of a number of poles, a primary winding for producing a field of a number of poles other than said number or double or half said number of poles, said secondary winding being arranged in unit blocks or groups, similarly situated coils of the unit blocks or groups being interconnected to form local circuit paths giving a field corresponding to the number of poles of said primary winding.

5. In an alternating current motor, a secondary winding of the distributed type adapted for operation with a field of a number of poles, and means external to said winding for connecting the terminals thereof together so that currents can flow in said winding to give a field of said number of poles, said winding being arranged in unit blocks or groups, the coils of the respective blocks or groups being interconnected in such a way that currents can flow in short-circuited star connected paths giving a field of a number of poles other than said number or double or half said number of poles.

6. In an alternating current motor, a secondary winding of the distributed type adapted for operation with a field of a number of poles, means external to said secondary winding for connecting the terminals thereof together so that currents can flow in said winding to give a field of said number of poles, and primary means for producing a field of a number of poles equal to said number of poles and for producing a field of a number of poles other than said number or double or half said number of poles, said secondary winding being arranged in unit blocks or groups, the coils of the respective unit blocks or groups being interconnected in such a way that currents can flow in local circuit paths giving a field of a number of poles other than said number or double or half said number of poles and corresponding to the number of poles produced by said means.

7. In an alternating current motor, a secondary winding of the distributed type adapted for operation with a field of a number of poles, means external to said winding for connecting the terminals thereof together so that currents can flow in said winding to give a field of said number of poles, and primary means for producing a field of a number of poles equal to said number of poles and for producing a field of a number of poles other than said number or double or half said number of poles, said secondary winding being arranged in unit blocks or groups, the coils of the respective unit blocks or groups being interconnected in such a way that currents can flow in short-circuited star connected paths giving a field of a number of poles other than said number or double or half said number of poles and corresponding to the number of poles produced by said means.

8. In an alternating current motor, a secondary winding of the distributed type adapted for cascade operation with different basal numbers of poles, said winding being arranged in unit blocks or groups similarly situated coils of the unit blocks or groups being interconnected to form local circuit paths giving fields of numbers of poles other than the basal pole numbers, some of said local circuit paths being connected in mesh, and others of said local circuit paths connected to points of the mesh.

9. In an alternating current motor, a secondary winding of the distributed type adapted for cascade operation with different basal numbers of poles, a primary winding for producing a field of a number of poles other than the basal pole numbers, said secondary winding being arranged in unit blocks or groups, similarly situated coils of the unit blocks or groups being interconnected to form local circuit paths giving a field corresponding to the number of poles of said primary winding, some of said local circuit paths being connected in mesh, and others of said local circuit paths connected to points of the mesh.

10. In an alternating current motor, a secondary winding of the distributed type adapted for cascade operation with different basal numbers of poles, means external to said secondary winding for connecting the terminals thereof together so that currents can flow in said winding to give fields of the basal numbers of poles, and primary means for producing a field of a number of poles other than the basal numbers of poles and for producing fields equal to the basal numbers of poles, said secondary winding being arranged in unit blocks or groups, similarly situated coils of the unit blocks or groups being interconnected to form local circuit paths giving a field of a number of poles other than the basal numbers of poles and corresponding to the number of poles produced by said means, some of said local circuit paths being connected in mesh and others of said local circuit paths being connected to the points of the mesh.

In witness whereof, I have hereunto set my hand this twenty fourth day of November, 1915.

LOUIS J. HUNT.